(12) United States Patent
Duckett

(10) Patent No.: US 9,706,027 B1
(45) Date of Patent: Jul. 11, 2017

(54) SYSTEM AND APPARATUS ATTACHING TO A MOBILE DEVICE FOR PROVIDING HANDS-FREE USE THEREOF AND CARRYING PERSONAL ITEMS THEREON

(71) Applicant: Sondra Renay Duckett, Madison, AL (US)

(72) Inventor: Sondra Renay Duckett, Madison, AL (US)

( * ) Notice: Subject to any disclaimer, the term of this patent is extended or adjusted under 35 U.S.C. 154(b) by 0 days.

(21) Appl. No.: 15/198,760

(22) Filed: Jun. 30, 2016

Related U.S. Application Data

(60) Provisional application No. 62/274,658, filed on Jan. 4, 2016.

(51) Int. Cl.
| | |
|---|---|
| *H04B 1/06* | (2006.01) |
| *H04M 1/04* | (2006.01) |
| *H04M 1/21* | (2006.01) |
| *H04B 1/3888* | (2015.01) |

(52) U.S. Cl.
CPC ............ *H04M 1/04* (2013.01); *H04B 1/3888* (2013.01); *H04M 1/21* (2013.01)

(58) Field of Classification Search
CPC ............ H04M 1/04; H04M 1/21; H04B 1/388
USPC ................. 455/344, 346, 347, 899
See application file for complete search history.

(56) References Cited

U.S. PATENT DOCUMENTS

| | | | |
|---|---|---|---|
| 8,971,560 B2* | 3/2015 | Lyons | H04R 1/026 381/334 |
| 2013/0142371 A1* | 6/2013 | Martin | H04R 1/025 381/333 |

* cited by examiner

*Primary Examiner* — Sonny Trinh
(74) *Attorney, Agent, or Firm* — Dunlap Bennett & Ludwig PLLC

(57) ABSTRACT

A system and apparatus for attaching to a mobile device for hands-free use thereof and carrying personal items thereon is provided. The apparatus includes a base having a dependent tube that pivots about an edge of the base. The base provides a connection between the mobile device enabling an adjustable attachment point so that base may be oriented in various non-planar relationships with the mobile device, enabling a plurality of brace-like propping configurations, that in conjunction with the positionable tube, afford the hands-free propping of the mobile device.

9 Claims, 4 Drawing Sheets

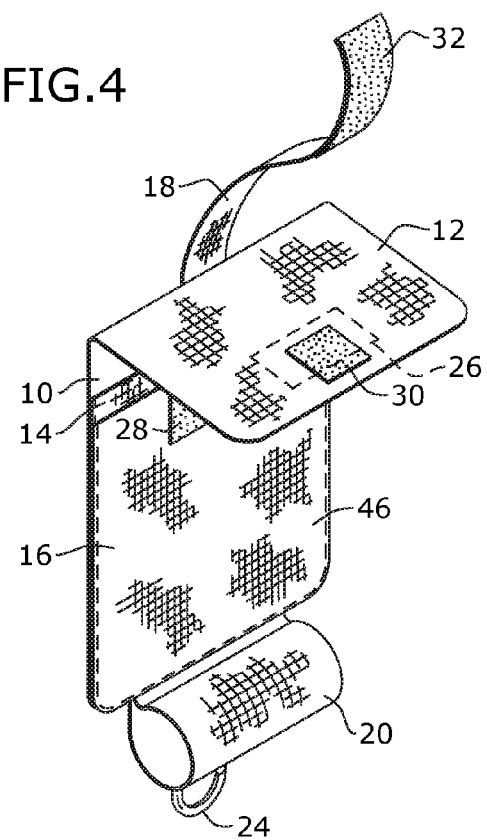
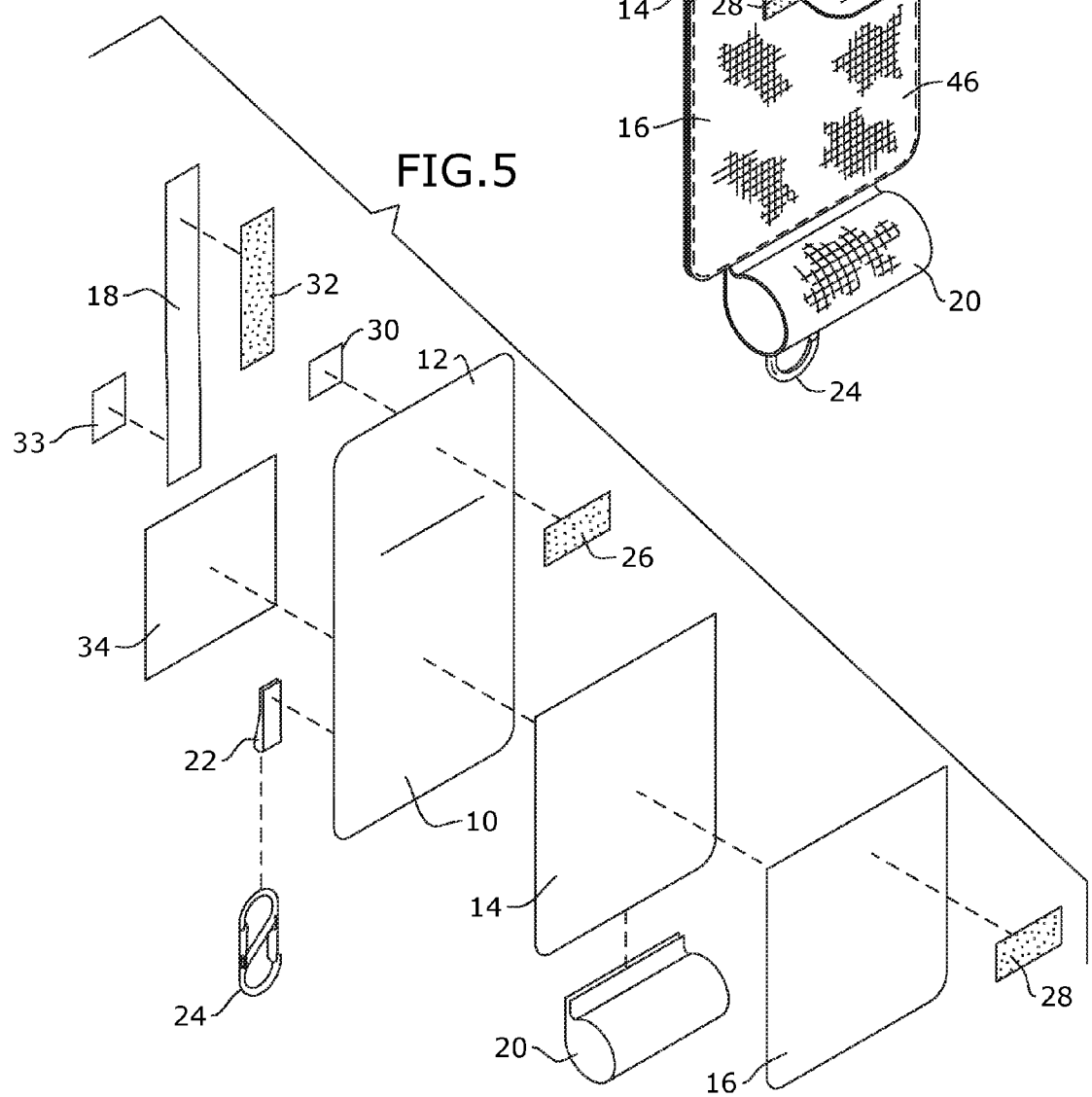

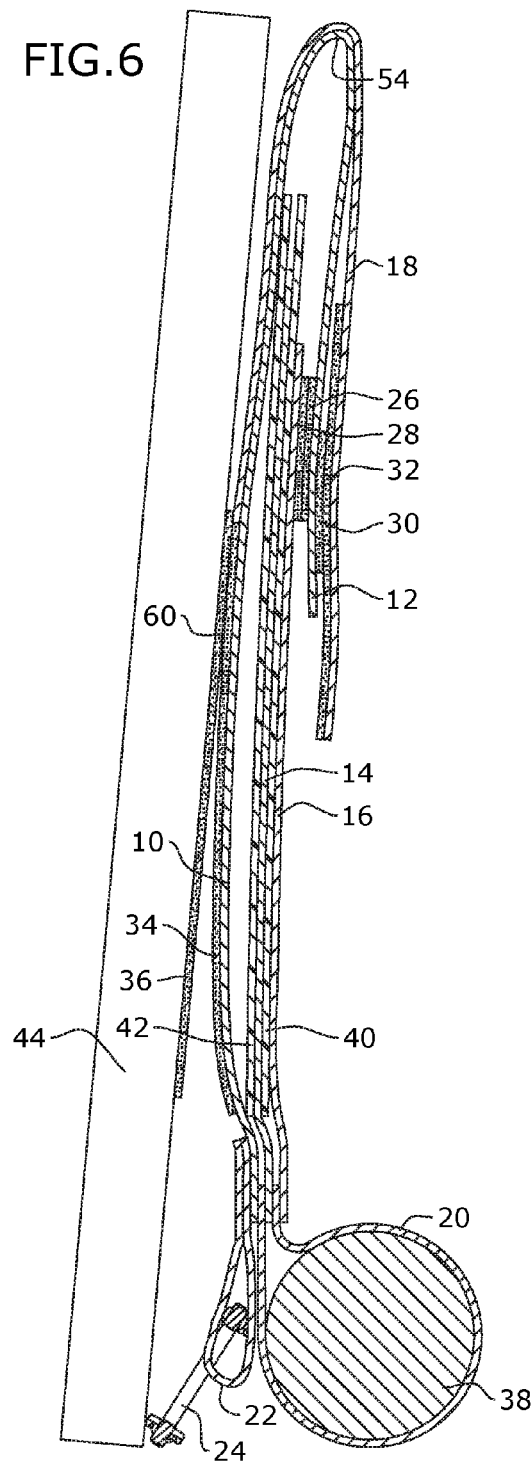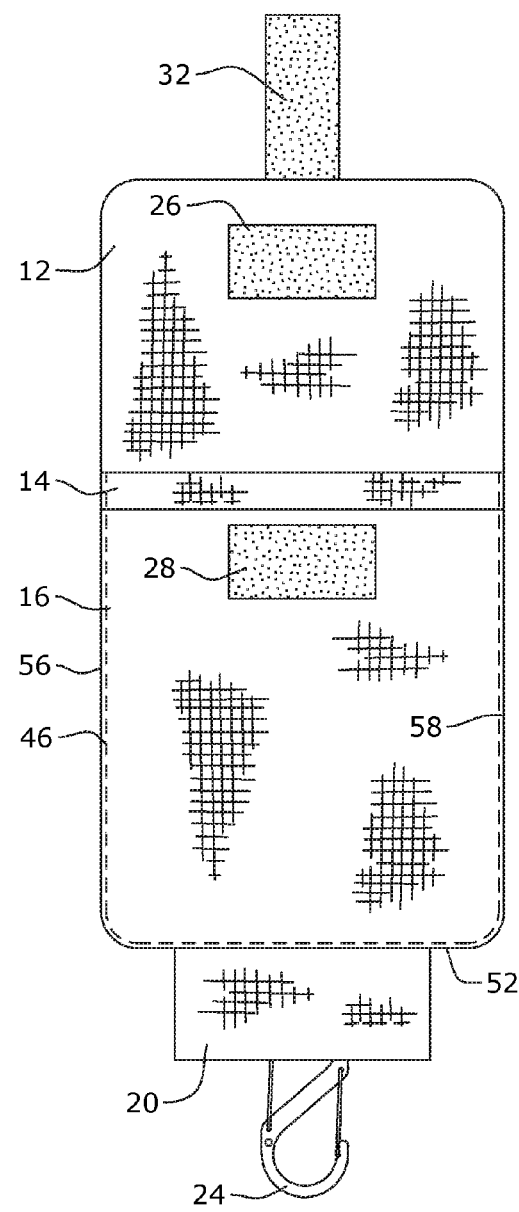

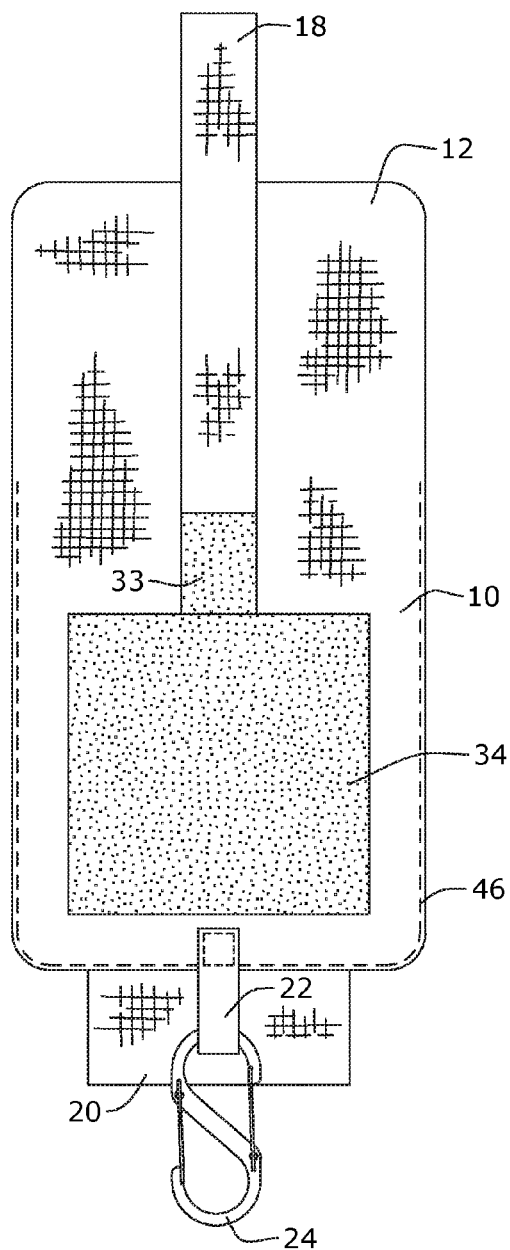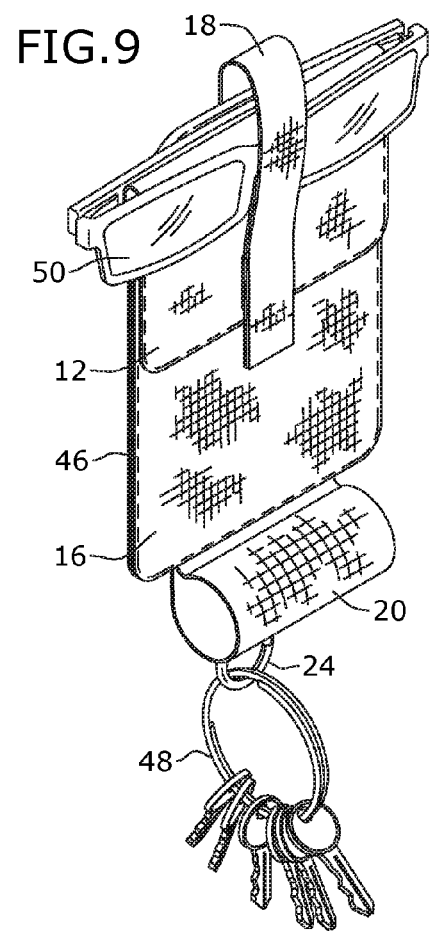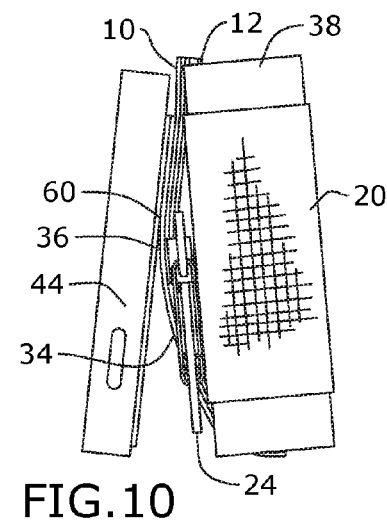
FIG. 9
FIG. 8
FIG. 10

SYSTEM AND APPARATUS ATTACHING TO A MOBILE DEVICE FOR PROVIDING HANDS-FREE USE THEREOF AND CARRYING PERSONAL ITEMS THEREON

CROSS-REFERENCE TO RELATED APPLICATION

This application claims the benefit of priority of U.S. provisional application No. 62/274,658, filed 4 Jan. 2016, the contents of which are herein incorporated by reference.

BACKGROUND OF THE INVENTION

The present invention relates to mobile device accessories and, more particularly, to a system and apparatus for attaching to a mobile device for providing hands-free use thereof and carrying personal items thereon.

Our mobile devices, such as our smart phones, are very important to us, which is way they are always in arm's reach. One of the reasons for this is that such mobile devices enable their user to view video content and images. Many such mobile devices, however, require to be handheld when enjoying such viewing, demanding either crafting a makeshift stand or lugging around a stand on their person. The last option being problematic because most people seeking convenience do not appreciate having another bulky item to haul around. Moreover, almost everybody is looking for the opposite: convenient ways to easily carry various personal items; rather than hunting in the bottom of their carrying bag for desired items or trying to remember which pocket you have your business card in or wondering, yet again, where are your keys.

Currently, unfortunately, there is no singular article on the market for attaching to a mobile device for holding necessities that also simultaneously props up the mobile device for one's viewing enjoyment.

As can be seen, there is a need for a system and apparatus for attaching to a mobile device for providing hands-free use thereof and carrying personal items thereon.

SUMMARY OF THE INVENTION

In one aspect of the present invention, an apparatus for propping up a mobile device while attaching personal items thereto including a base having a first surface and an opposing second surface, each surface defined by (a) opposing top and bottom ends and (b) two opposing peripheral edges; a base connector provided along the first surface; and a tube extending parallel to and pivotally attached along the bottom end.

In yet another aspect of the present invention, the apparatus further includes a device connector providing an adhesive portion for attaching to an object, wherein the device and base connectors are dimensioned so that a plurality of attachment points are definable between the device and base connectors, wherein the dimensions of the device and base connectors are each approximately two by two and one half inches, wherein the device and base connectors are compatible hook and loop connectors, respectively, further including at least one pocket provided by the second surface; a flap pivotally connected along the top end for moving between an open and a closed condition overlapping each opening of the two pockets; a strap attached near the top end for securing readers or sunglasses; the flap in the closed condition and sandwiching a first personal item against the flap; a loop attached near the bottom end; and a tubular personal item received and secured within the tube.

In yet another aspect of the present invention, a method of propping up a mobile device using the above-mentioned apparatus includes the steps of providing a supporting surface; adhering the adhesive portion of the device connector to a rear portion of the mobile device; connecting the base connector to the device connector so that the attachment point enables the bottom or top end to be at a substantial distance further from the mobile device compared to the top or bottom end, respectively; and the tube and the mobile device are spaced apart along the supporting surface, and in certain embodiments securing a tubular personal item within the tube.

These and other features, aspects and advantages of the present invention will become better understood with reference to the following drawings, description and claims.

BRIEF DESCRIPTION OF THE DRAWINGS

FIG. 4 is a front perspective view of an exemplary embodiment of the present invention, in an open condition;

FIG. 5 is an exploded view of an exemplary embodiment of the present invention;

FIG. 6 is a section view of an exemplary embodiment of the present invention, taken along line 6-6 in FIG. 1

FIG. 7 is a front elevational view of an exemplary embodiment of the present invention, in the open condition;

FIG. 8 is a rear elevational view of an exemplary embodiment of the present invention;

FIG. 9 is a perspective view of an exemplary embodiment of the present invention, shown in use carrying personal items; and FIG. 10 is a perspective view of an exemplary embodiment of the present invention, shown in a second propping configuration.

DETAILED DESCRIPTION OF THE INVENTION

Figure 1:
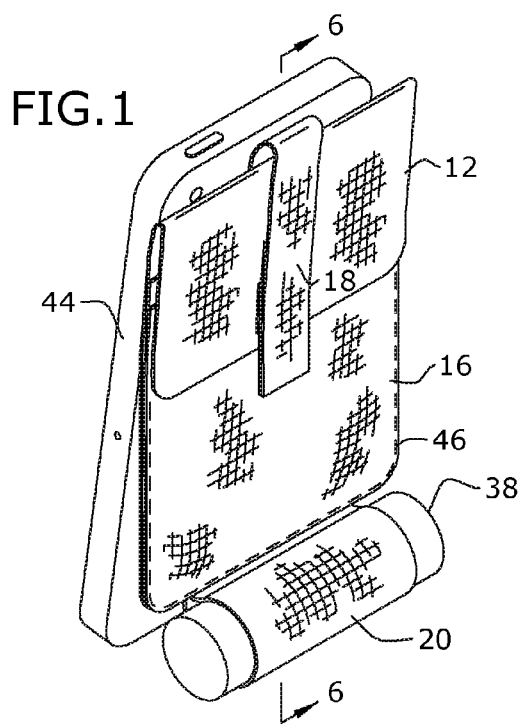
FIG. 1 is a perspective view of an exemplary embodiment of the present invention, shown in use in a first propping configuration.
Figure 2:
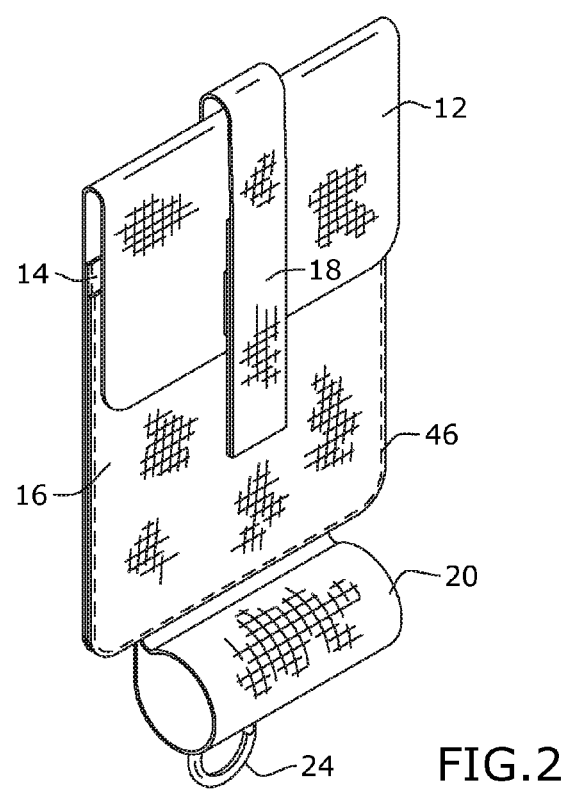
FIG. 2 is a front perspective view of an exemplary embodiment of the present invention, in a closed condition.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a system and apparatus for attaching to a mobile device for providing hands-free use thereof and carrying personal items thereon. The apparatus includes a base having a dependent tube that pivots about an edge of the base. The base provides a connection between the mobile device enabling an adjustable attachment point so that base may be oriented in various non-planar relationships with the mobile device, enabling a plurality of brace-like propping configurations, that in conjunction with the positionable tube, afford the hands-free propping of the mobile device.

Referring to FIGS. 1 through 10, the present invention may include a system and apparatus 100 for attaching to a mobile device 44 for hands-free use thereof and carrying personal items thereon. The personal items may include, but not be limited to, a tubular applicator 38, a credit card 40, an identification card 42, a set of keys 48, a pair of glasses 50, and the like.

The apparatus 100 may include a base 10 having a first and an opposing second surface, each extending from a top end 54 to a bottom end 52. A back pocket 14 may be attached to the second surface so that a front pocket 16 may be attached to the back pocket 14, providing a tiered relationship between the front and rear pockets 14, 16, with the openings of each pocket 14, 16 oriented toward the top end 54 of the base 10, as illustrated in FIGS. 4 and 5. A flap 12 pivotally connected to the top end 54 may move between an open condition to a closed condition covering the openings of each pocket 14, 16, as illustrated in FIG. 1.

It being understood that the first and second surfaces relationship of the base 10 are mirrored in the flap 12, the back pocket 14, and the front pocket 16 elements. Mindful of the immediately-above understanding and the forgone disclosure, the first and second surface of the flap 12 may provide a first flap and second flap connector 26, 30, respectively (wherein the first and second surfaces of the flap 12 are defined in the closed condition). The second surface of the front pocket 16 may provide a pocket connector 28. The first flap connector 26 may be adapted to selectively engage the pocket connector 28 in the closed condition, preventing the flap 12 from moving to the open configuration without a predetermined force applied thereto.

A strap 18 may be pivotally attached along the first surface or near the top end 54 of the base 10 so that the strap 18 extends to overlap at least a portion of the flap 12 in a secured configuration, wherein the strap 18 is movable between the secured configuration and an unsecured configuration. The strap 18 may provide a strap connector 32 adapted to selectively engage the second flap connector 30 in the secured configuration, securing a personal item, such as the pair of glasses 50 between the strap 18 and the second surface of the flap 12, as illustrated in FIG. 9.

Near a bottom end 52 of the base 10, a loop 22 may be attached. The loop 22 may be attached to either the first or second surface of the base 10, or even to both. The loop 22 may be dimensioned and adapted to operatively engage a hook 24, which in turn may be employed to clasp onto a personal item, such as the set of keys 48.

A base connector 34 may be attached along the first surface of the base 10, as illustrated in the Figures. A complementary device connector 36 may provide adhesive so as to act as a patch, adhering itself to a separate object 44, such as a mobile device. The device and base connectors 34 and 36 may adapted to detachably connect, so that the apparatus 100 is removably connected to the separate object 44, so that where the object 44 goes, so goes the apparatus 100, pockets 14, 16, flap 12, strap 18 and all. Furthermore, the device and base connectors 34 and 36 are dimensioned—i.e., having substantial dimensions along two orthogonal axes—so that various attachment points 60 (defined at the interface of the device and base connectors 34 and 36) may be provided, while still enabling a secure engagement there between. For example, the device and base connectors 34 and 36 may be approximately two inches by two inches.

Figure 3:
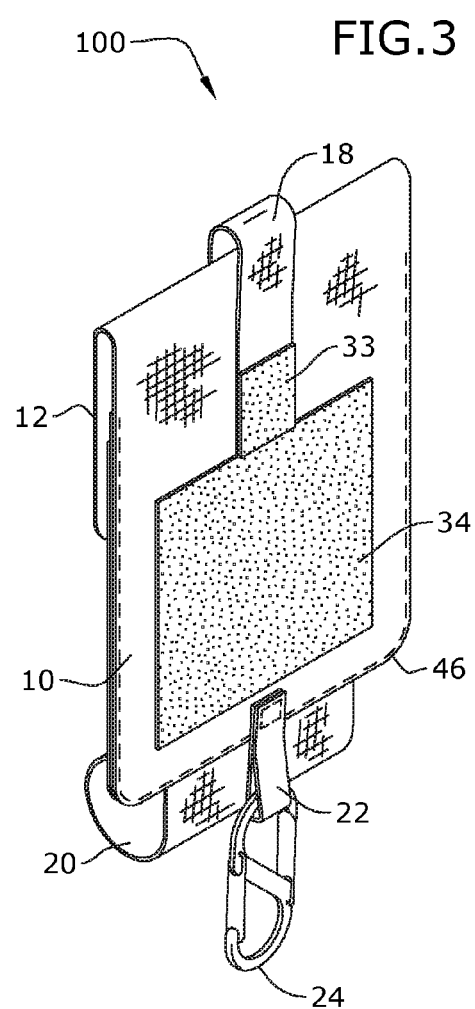
FIG. 3 is a rear perspective view of an exemplary embodiment of the present invention.

In certain embodiments, a first strap connector 33 may be provided by the strap 18 so that it is adjacent to the base connector 34, as illustrated in FIG. 3. The first strap connector 33 may be adapted to engage the device connector 36 or the strap connector 32 in the unsecured configuration so as to retain additional articles.

An elastic, resilient tube 20 may be provided near the bottom end 52 of the base 10. The tube 20 may be dimension to slidably receive and secure a tubular personal item, such as a tubular applicator 38, as illustrated in FIG. 1. The tube 20 may be pivotally dependent from the base 10 so as to rotate there about, positionable in a transverse relationship to the base 10, enabling a first "propping configuration" as illustrated in FIGS. 1 and 6, and a second propping configuration, as illustrated in FIG. 10. The ability of the connection of the device and base connectors 34 and 36 to adjust its attachment point 60, the sufficient balance of flexibility and rigidity of the base 10, the circular shape of the tube 20 and its dependent relationship with the bottom end 52 enables either propping configuration to stably support the object 44 along a supporting surface, whereby the object 44 is "propped up" without the need of external manipulation, such as by the use of a user's hand. The integrity of the tube 20 to maintain its tubular shape, with or without a tubular personal item secured therein, enables such brace-like property in either the first and second propping configuration.

In the first propping configuration, the tube 20 rotates to the point where its shape engages the second surface of the base 10/front pocket 16, and the attachment point may be adjusted so that with the bottom end 52 of the base 10 is further from the object 44, relative to its top end 54, bracing the object 44 in the first propping configuration. In the second propping configuration, the attachment point 60 may be defined by detaching/attaching the device and base connectors 34 and 36 so that a right edge 58 of the base 10 is further from the object 44 than an opposing left edge 56. In other words, the attachment point 60 may be defined in at least two transverse orientations along the device and base connectors 34 and 36 interface to enable either propping configuration, with the aid of the tube 20.

The base 10, flap 12, pockets 14, 16 may be coupled together by sewing 46, adhesive or other suitable attachment elements.

The connectors 26-36 may be cooperating portions of hook and loop connectors, or any other suitable detachable connectors.

A method of using the present invention may include the following. The apparatus 100 disclosed above and a predetermined object 44 may be provided. A user may first attach the adhesive portion of the device connector 36 to the predetermined object 44 so that the base connector 34 may removable connect thereto, removably affixing the apparatus 100 to the predetermined object 44. Then the user may secure personal items in/by the pockets 14, 16, the tube 20, the hook 24 and/or the strap 18. Then when the user wants to prop the object 44 on a supporting surface in the first propping configuration, the attachment point 60 is adjusted so that the bottom end 52 is further from the base 10 than the top end 54 (or vice versa, as the case may be) so that the tube 20 is positioned transverse to the bottom end 52, whereby the object 44 and the tube 20, spaced apart, interface with the supporting surface so as to afford the first propping configuration. Thereafter, if the user wants to orient the object 44 about 90 degrees, the second propping configuration is formed by adjusting the attachment point 60 so that the right edge 58 is further from the object 44 than the left edge 56 (or vice versa, as the case may be) so that the tube 20 is positioned transverse to the bottom end 52, whereby the object 44 and the tube 20, spaced apart, interface with the supporting surface so as to afford the first propping configuration.

Accordingly, the present invention allows users to easily watch a favorite movie or chat on Facetime or Skype via their mobile phone 44—hands free—because the apparatus 100 is removably attached to the back of the mobile phone 44, whereby the user's necessities are secured via the apparatus 100 to the back thereof.

It should be understood, of course, that the foregoing relates to exemplary embodiments of the invention and that modifications may be made without departing from the spirit and scope of the invention as set forth in the following claims.

What is claimed is:

1. An apparatus, comprising:
    a base having a first surface and an opposing second surface, each surface defined by (a) opposing top and bottom ends and (b) two opposing peripheral edges;
    a base connector provided along the first surface;
    a tube extending parallel to and pivotally attached along the bottom end; and
    a device connector providing an adhesive portion for attaching to an object, wherein the device and base connectors are dimensioned so that a plurality of attachment points are definable between the device and base connectors, and wherein the device and base connectors are compatible hook and loop connectors, respectively.

2. The apparatus of claim 1, wherein the dimensions of the device and base connectors are each approximately two by two and one half inches.

3. The apparatus of claim 1, further comprising at least one pocket provided by the second surface.

4. The apparatus of claim 3, further comprising a flap pivotally connected along the top end for moving between an open and a closed condition overlapping each opening of the at least one pocket.

5. The apparatus of claim 4, further comprising a strap attached near the top end for securing readers or sunglasses the flap in the closed condition and sandwiching a first personal item against the flap.

6. The apparatus of claim 5, further comprising a loop attached near the bottom end.

7. The apparatus of claim 1, further comprising a tubular personal item received and secured within the tube.

8. A method of propping up a mobile device using the apparatus of claim 1, comprising the steps of:
    providing a supporting surface;
    adhering the adhesive portion of the device connector to a rear portion of the mobile device;
    connecting the base connector to the device connector so that the attachment point enables the bottom or top end to be at a substantial distance further from the mobile device compared to the top or bottom end, respectively; and
    the tube and the mobile device are spaced apart along the supporting surface.

9. The method of claim 8, further comprising securing a tubular personal item within the tube.

* * * * *